United States Patent
Olsen

(10) Patent No.: US 10,125,549 B2
(45) Date of Patent: Nov. 13, 2018

(54) CUTTING ELEMENT SUPPORT SHOE FOR DRILL BIT

(71) Applicant: Halliburton Energy Services, Inc., Houston, TX (US)

(72) Inventor: Garrett T. Olsen, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 231 days.

(21) Appl. No.: 15/024,155

(22) PCT Filed: Nov. 19, 2013

(86) PCT No.: PCT/US2013/070683
§ 371 (c)(1),
(2) Date: Mar. 23, 2016

(87) PCT Pub. No.: WO2015/076778
PCT Pub. Date: May 28, 2015

(65) Prior Publication Data
US 2016/0215567 A1 Jul. 28, 2016

(51) Int. Cl.
*E21B 10/42* (2006.01)
*E21B 10/567* (2006.01)
(Continued)

(52) U.S. Cl.
CPC .............. *E21B 10/42* (2013.01); *B23P 15/28* (2013.01); *E21B 10/54* (2013.01); *E21B 10/567* (2013.01); *E21B 10/62* (2013.01)

(58) Field of Classification Search
CPC .................................. E21B 10/55; E21B 10/62
See application file for complete search history.

(56) References Cited

U.S. PATENT DOCUMENTS 3,688,984 A * 9/1972 Sonneville .............. E01B 9/306
238/283
5,152,186 A * 10/1992 Dettinger .............. B41F 13/012
74/409
(Continued)

FOREIGN PATENT DOCUMENTS

CN 202140023 U 2/2012
CN 103032026 A 4/2013
WO WO 2012/116148 A1 8/2012

OTHER PUBLICATIONS

Chinese State Intellectual Property Office, First Office Action, dated Mar. 1, 2017, 8 pages, Chinese.
(Continued)

*Primary Examiner* — Shane Bomar

(57) ABSTRACT

A drill bit in which a cutting element support shoe is mounted to a drill bit member so that it covers a portion of a number cutting elements while leaving the cutting edges of cutting elements exposed to the formation. The drill bit member may include a bit body, blade, arm, or roller, for example. The drill bit member may include a recess into which the cutting element support shoe is received. Cutting element support shoe provides mechanical holding of the cutting elements within their pockets in addition to conventional brazing or other mounting techniques. Once installed, a hard facing material may be applied over the cutting element support shoe as appropriate for increased erosion resistance. In one embodiment, the cutting element support shoe is sized so that when mounted to the drill bit member it is elastically deformed, thereby providing additional cutter retaining force upon attachment.

18 Claims, 6 Drawing Sheets

(51) Int. Cl.
E21B 10/62 (2006.01)
B23P 15/28 (2006.01)
E21B 10/54 (2006.01)

(56) References Cited

U.S. PATENT DOCUMENTS

| | | |
|---|---|---|
| 2007/0278017 A1 | 12/2007 | Shen et al. |
| 2011/0114393 A1 | 5/2011 | Dolan et al. |
| 2011/0127088 A1 | 6/2011 | Voronin et al. |
| 2011/0297454 A1 | 12/2011 | Shen et al. |
| 2012/0043138 A1* | 2/2012 | Myers .................. E21B 10/633 175/428 |
| 2012/0247840 A1* | 10/2012 | Vempati .................. E21B 10/43 74/409 |

OTHER PUBLICATIONS

International Search Report and the Written Opinion of the International Search Authority, or the Declaration, dated Aug. 20, 2014, PCT/US2013/070683, 13 pages, ISA/KR.

\* cited by examiner

CUTTING ELEMENT SUPPORT SHOE FOR DRILL BIT

The present application is a U.S. National Stage patent application of International Patent Application No. PCT/US2013/070683, filed on Nov. 19, 2013, the benefit of which is claimed and the disclosure of which is incorporated herein by reference in its entirety.

TECHNICAL FIELD

The present disclosure relates generally to oilfield equipment, and in particular to earth-boring drill bits used to drill a borehole for the recovery of oil, gas, or minerals. More particularly, the disclosure relates to the mounting of ultra-hard cutting elements to the bit body, blades, or roller cones.

BACKGROUND

Oil wells and gas wells are typically drilled by a process of rotary drilling. An earth-boring drill bit is mounted on the lower end of a drill string. Weight is applied on the drill bit, and the bit is rotated by rotating the drill string at the surface, by actuation of a downhole motor, or both. The rotating drill bit includes cutting elements that engage the earthen formation to form a borehole. The bit can be guided to some extent using an optional directional drilling assembly located downhole in the drill string, to form the borehole along a predetermined path toward a target zone.

Many different types of drill bits and cutting structures for bits have been developed and found useful in drilling such boreholes. Two predominate types of rock bits are roller cone bits and fixed cutter bits. Both types of bits may include hardened elements that engage the earth to cut and liberate earthen materials such as rock. Roller cone bits include cutting elements that cut earth by gouging-scraping or chipping-crushing action. Fixed cutter bits include cutting elements that cut earth by shearing action.

While the drill bit is rotated, drilling fluid is pumped through the drill string and directed out of the drill bit. The drill bit typically includes nozzles or fixed ports spaced about the bit face that serve to inject drilling fluid into the flow passageways between the several blades or amongst the roller cones. The flowing fluid performs several important functions. The fluid removes formation cuttings from the drill bit's cutting structure. Otherwise, accumulation of formation materials on the cutting structure may reduce or prevent the penetration of the cutting structure into the formation. In addition, the fluid removes cut formation materials from the bottom of the hole. Failure to remove formation materials from the bottom of the hole may result in subsequent passes by cutting structure to re-cut the same materials, thus reducing cutting rate and potentially increasing wear on the cutting surfaces. The drilling fluid and cuttings removed from the bit face and from the bottom of the hole are forced from the bottom of the borehole to the surface through the annulus that exists between the drill string and the borehole sidewall.

Further, the fluid removes heat, caused by contact with the formation, from the cutting elements in order to prolong cutting element life. Thus, the number and placement of drilling fluid nozzles, and the resulting flow of drilling fluid, may significantly affect the performance of the drill bit.

BRIEF DESCRIPTION OF THE DRAWINGS

Embodiments are described in detail hereinafter with reference to the accompanying figures, in which.

DETAILED DESCRIPTION

Figure 1:
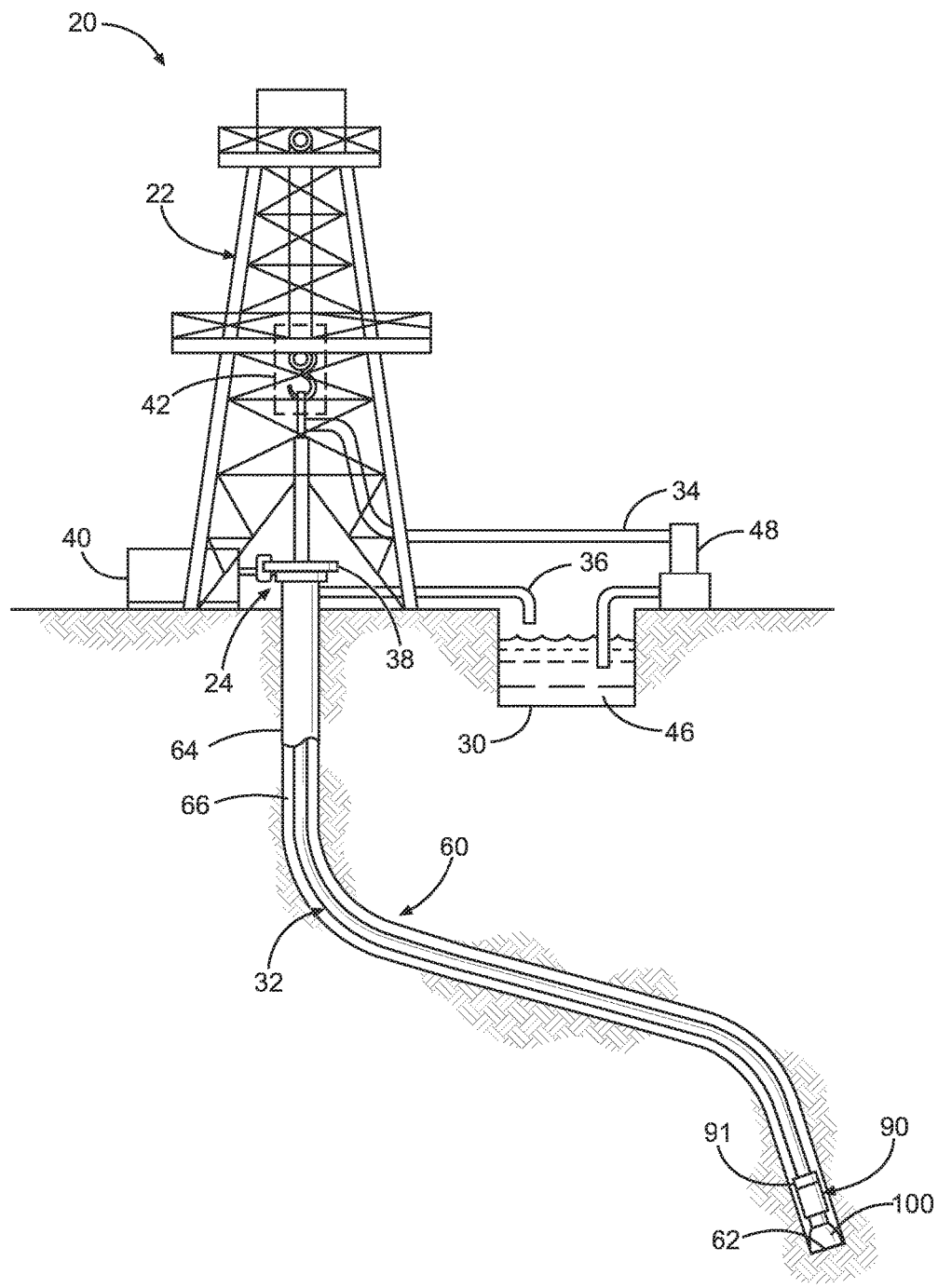
FIG. 1 is a block-level schematic diagram of a drilling system according to an embodiment, showing a drill string and the drill bit of FIG. 2 for drilling a bore in the earth.

FIG. 1 is an elevation view of one example of a drilling system 20 including a drill bit 100. Drilling system 20 may include land drilling rig 22. However, teachings of the present disclosure may also be used in association with offshore platforms, semi-submersible, drill ships and any other drilling system satisfactory for forming a wellbore extending through one or more downhole formations.

Drilling rig 22 may be located proximate well head 24. Drilling rig 22 also includes rotary table 38, rotary drive motor 40 and other equipment associated with rotation of drill string 32 within wellbore 60. Annulus 66 may be formed between the exterior of drill string 32 and the inside diameter of wellbore 60.

For some applications drilling rig 22 may also include top drive motor or top drive unit 42. Blow out preventers (not expressly shown) and other equipment associated with drilling a wellbore may also be provided at well head 24. One or more pumps 48 may be used to pump drilling fluid 46 from reservoir 30 to one end of drill string 32 extending from well head 24. Conduit 34 may be used to supply drilling mud from pump 48 to the one end of drilling string 32 extending from well head 24. Conduit 36 may be used to return drilling fluid, formation cuttings and/or downhole debris from the bottom or end 62 of wellbore 60 to fluid reservoir or pit 30. Various types of pipes, tube and/or conduits may be used to form conduits 34 and 36.

Drill string 32 may extend from well head 24 and may be coupled with a supply of drilling fluid such as reservoir 30. The opposite end of drill string 32 may include bottom hole assembly 90 and rotary drill bit 100 disposed adjacent to end 62 of wellbore 60. Rotary drill bit 100 may include one or more fluid flow passageways with respective nozzles 20 (FIG. 2) disposed therein, as described in greater detail below. Various types of drilling fluids 46 may be pumped from reservoir 30 through pump 48 and conduit 34 to the end of drill string 32 extending from well head 24. The drilling fluid 46 may flow down through drill string 32 and exit from nozzles 16 (FIG. 2) formed in rotary drill bit 100.

At end 62 of wellbore 60, drilling fluid 46 may mix with formation cuttings and other downhole debris proximate drill bit 100. The drilling fluid will then flow upwardly through annulus 66 to return formation cuttings and other downhole debris to well head 24. Conduit 36 may return the drilling fluid to reservoir 30. Various types of screens, filters and/or centrifuges (not shown) may be provided to remove formation cuttings and other downhole debris prior to returning drilling fluid to pit 30.

Bottom hole assembly 90 may include various tools 91 that provide logging or measurement data and other information from the bottom of wellbore 60. Measurement data and other information may be communicated from end 62 of wellbore 60 through drill string 32 using known measurement while drilling techniques and converted to electrical signals at well surface 24, to, among other things, monitor the performance of drilling string 32, bottom hole assembly 90 and associated rotary drill bit 100.

Figure 2:
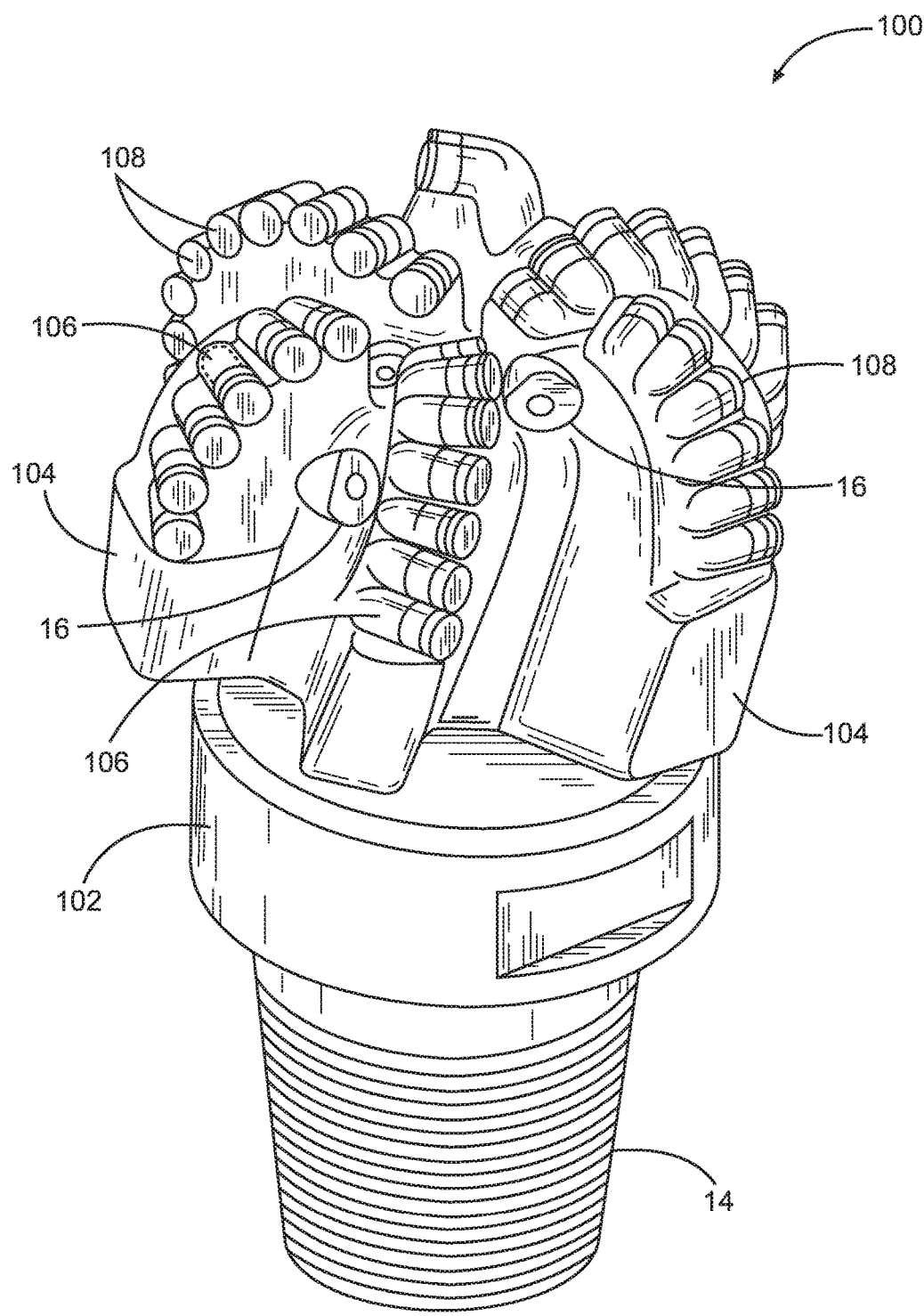
FIG. 2 is a perspective view of a fixed cutter drill bit according to a preferred embodiment, showing blades having pockets with hard cutting elements positioned and fixed therein.

FIG. 2 is a perspective view of one embodiment of drill bit 100. Drill bit 100 is a fixed cutter drill bit having a hollow bit body 102 that has a pin end 14 for threaded connection to a drill string 32 (shown in FIG. 1). A plurality of blades 104 extend from the other end of bit body 102. Each blade 104 forms a cutting surface of the bit 100. Although six blades are shown, any suitable number of straight or curved blades may be provided.

Drill bit 100 may be manufactured using powder metallurgy techniques, which generally entail blending and mixing metal powders, compressing the metal powders into a bit-shaped matrix, and sintering the matrix under elevated temperatures to cause solid-state bonding of the powders. However, drill bit 100 may also be manufactured by casting, forging, machining, or another suitable manufacturing process.

Blades 104 may include primary blades, secondary blades, and even tertiary blades, angularly spaced about the bit face, where the primary blades are generally longer and start at locations closer to the bit's central axis. Blades 104 project radially outward from the bit axis and form flow channels, sometimes referred to as junk slots, therebetween.

Each blade 104 carries a number of hard cutting elements 108. Each cutting element 108 is mounted in a respective pocket 106 formed in the leading edge of the blade. In certain embodiments, cutting elements 108 are made of a material sufficiently hard to cut through earth formations, such as by scraping and/or shearing. The configuration or layout of cutting elements 108 on the blades 104 may vary widely, depending on a number of factors. One of these factors is the formation itself, as different cutting element layouts cut the various strata with differing results and effectiveness.

Cutting element materials may include tungsten carbide, polycrystalline diamond compact ("PDC"), natural diamond, or thermally stabilized PDC (TSP), milled steel teeth, or any other cutting elements of materials hard and strong enough to deform or cut through the formation. More specifically, cutting elements 108 may have a polycrystalline diamond or like surface formed on cutting surfaces, such as a PDC formed and bonded to a tungsten carbide substrate under one or more high-temperature, high-pressure cycles.

Each cutting element 108 may be manufactured as a discrete piece. Each cutting element may be formed of an elongate and generally cylindrical support member, which may be a cemented metal carbide for example, such as tungsten carbide, to which substrate may be bonded a layer or table formed of an extremely hard super-abrasive material such polycrystalline diamond compact (PCD), cubic boron nitride, thermally stable PDC (TSP), polycrystalline cubic boron nitride, or ultra-hard tungsten carbide (TC). Cemented metal carbide substrates may be formed by sintering powdered metal carbide with a metal alloy binder, and the table may be formed and bonded to the substrate using an ultra-high pressure, ultra-high temperature process. A cutting element may also include transitional layers in which metal carbide and diamond are mixed with other elements for improving bonding and reducing stress between the substrate and the table.

Cutting elements 108 may have a flat or slightly ovoid outer contact region that defines a point, line, or area where the element contacts the rock formation being cut. The cutting elements 108 may be spaced apart on a blade 104 in a fixed, predetermined pattern, typically arrayed along the leading edges of each of several blades 104 so as to present a predetermined cutting profile to the earth formation. That is, each cutting element 108 is positioned and oriented on bit 100 so that a portion of it, its cutting edge or wear surface, engages the earth formation as the bit is being rotated.

Cutting elements 108 may be initially mounted to drill bit 100 in one or more of three processes. According to the first two processes, the drill bit 100 is formed to include pockets 106 into which cutting elements are received. Cutting elements 108 are either inserted into the pockets 106 and press fit or brazed to drill bit 100, or cutting elements 108 are brazed to an attachment member, such as a stud or a cylindrical backing, which is in turn mounted to drill bit 100 by press-fitting or brazing. Although brazing and press-fitting are preferred methods of attachment, cementing, hard facing, and other techniques may be used as appropriate. According to the third method, in the case of a drill bit manufactured using powdered metallurgy, which may be made, for instance, by filling a graphite mold with metallic particulate matter such as powdered tungsten, compacting, sintering, and then infiltrating the powdered metal matrix with a molten metal alloy, cutting elements 108 may be placed in the matrix before infiltration and bonded in place by the infiltration process.

Drill bit 100 may include one or more nozzles 16 for jetting drilling fluid to aid in formation cutting, tool cooling, lubrication, and debris removal. Nozzles are fluidly connected within body 102 and receive drilling fluid via the drill string 32 (FIG. 1).

Figure 3:
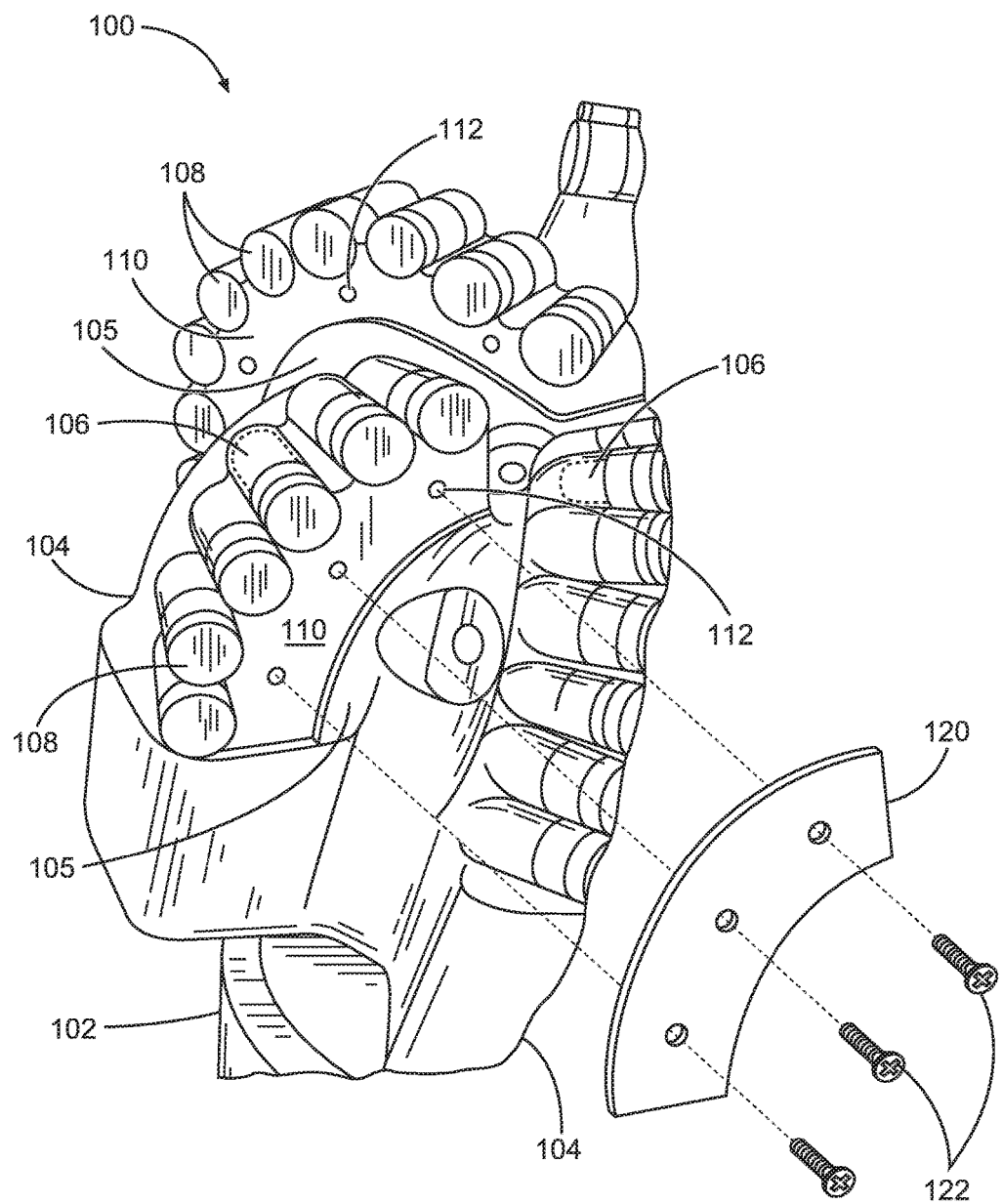
FIG. 3 is an exploded diagram of a portion of the fixed cutter drill bit of FIG. 2, showing a recess formed in the leading edge of a blade and a cutting element support shoe dimensioned to be received and mounted within the recess.

FIG. 3 is an exploded perspective view of a portion of drill bit 100. The leading face 105 of one or more blades 104 may include a recess 110 and a number of threaded holes 112 formed therein. A cutting element support shoe 120, sized to fit within recess 110, is provided. Screws 122 are used to mount cutting element support shoe 120 to its respective blade 104, thereby allowing cutting element support shoe 120 to be readily removed as necessary for maintaining and/or repairing bit 100. However, other means to secure cutting element support shoe 120 within recess 110 may be used as appropriate, including clipping, pinning, riveting, brazing, welding, hard facing, and adhesively bonding.

Figure 4:
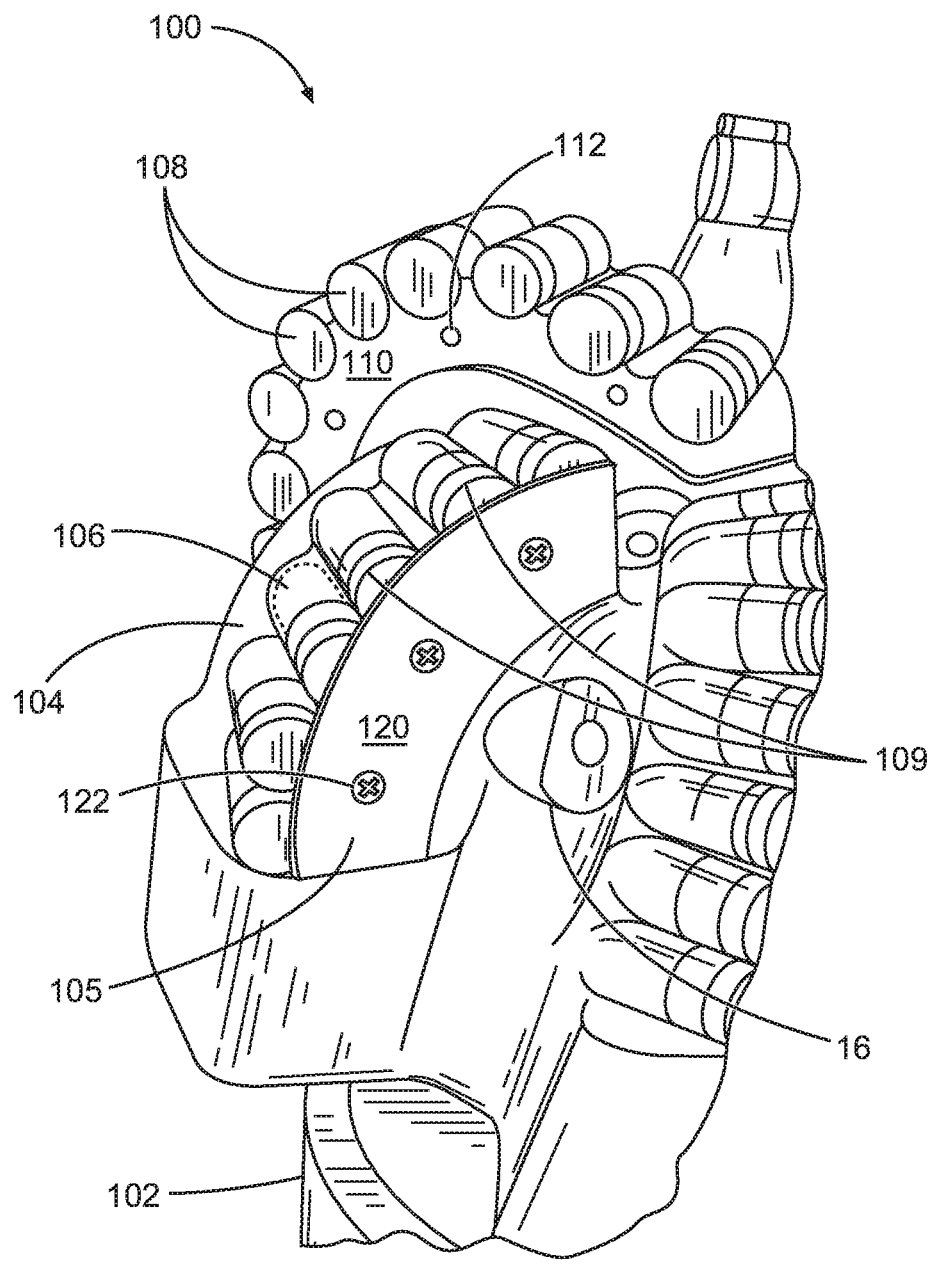
FIG. 4 is a perspective view of the portion of the drill bit of FIG. 3, showing a cutting element support shoe covering a portion of the cutting elements for added mechanical holding of the cutting elements within the pockets.

FIG. 4 is a perspective view of the portion of drill bit 100 of FIG. 3 shown in an assembled state. Cutting element support shoe 120 is sized so that it covers a portion of cutting elements 108 while leaving the cutting edges 109 of cutting elements 108 exposed to the formation. Cutting element support shoe 120 may cover two or more cutting elements 108 and preferably may cover all of the cutting elements 108 on a given blade 104. However, a number of cutting element support shoes 120 may be used on a given blade 104. In this manner, cutting elements 108 are physically locked or secured in place by shoe 120 in addition to whatever other fastening method is used, e.g. pressing or brazing. The additional structural support provided by cutting element support shoe 120 provides increased reliability of drill bit 100. Drill bit 100 therefore has improved performance due to fewer lost cutting elements during drilling operations.

Cutting element support shoe 120 may be manufactured from heat treated forged alloy steel, a chrome plated or high chrome iron forged steel, a forged steel with a carburized inner surface, or other suitable materials.

Once installed, a hard facing material may be applied, if desired, over cutting element support shoe 120 as appropriate for increased erosion resistance. Suitable hard facing materials may include steel and iron alloys, cobalt-based alloys, and nickel-based alloys, and may be applied by thermal spraying or oxyacetylene welding processes, for example. Other overlay or hardening processes may also be used as appropriate.

In one embodiment, cutting element support shoe 120 is sized so that when mounted to its corresponding blade 104, cutting element support shoe 120 is elastically deformed, thereby providing additional cutter retaining force upon attachment. Cutting element support shoe 120 may also include one or more recesses (not illustrated) to accommodate cutters 108.

Figure 5:
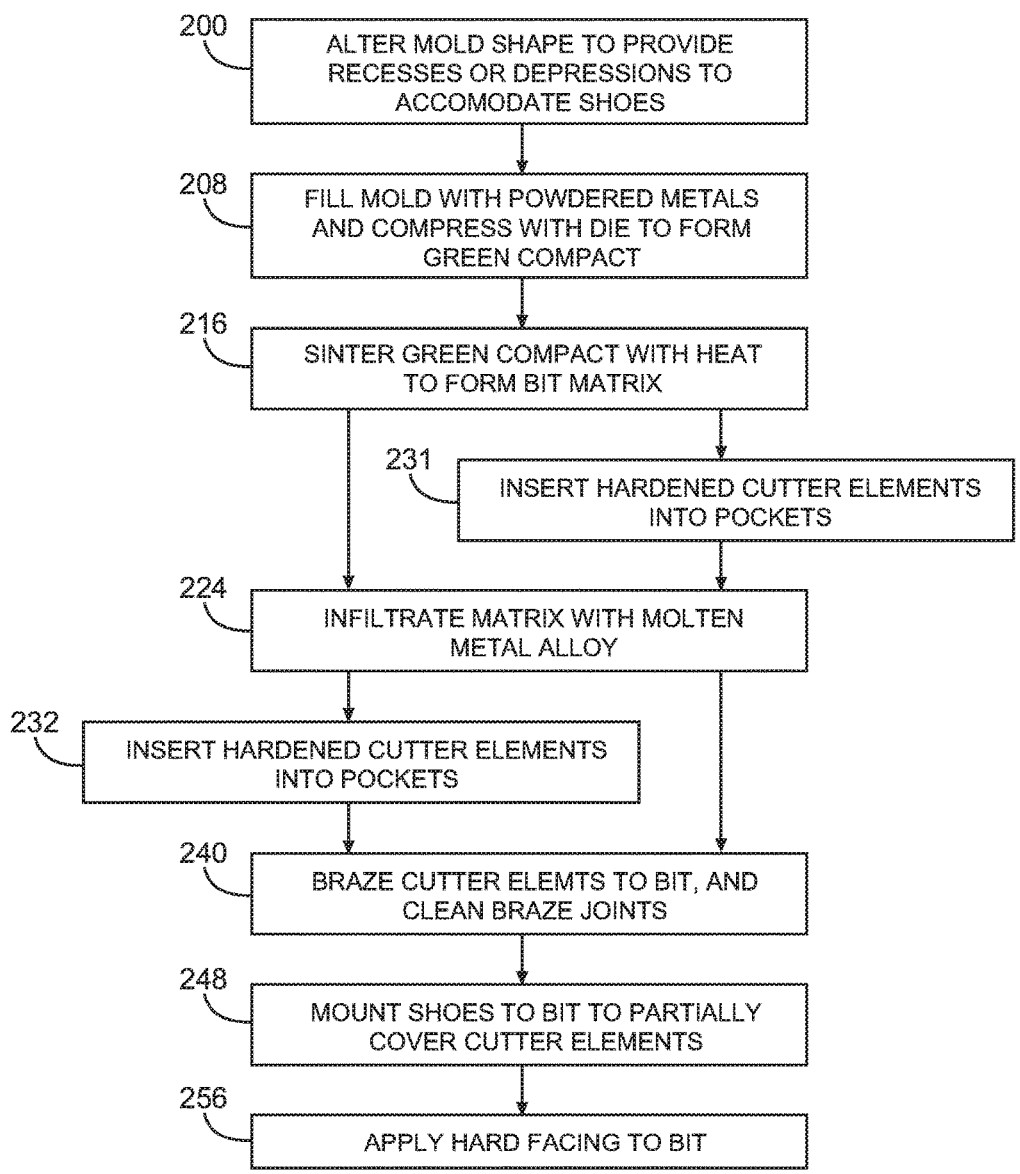
FIG. 5 is a flow chart of a method for manufacturing the drill bit of FIG. 3 according to an embodiment.

FIG. 5 is a flow chart that describes a method for manufacturing drill bit 100 according to an embodiment that employs powder metallurgy techniques. Referring to FIG. 5, as well as FIGS. 2-4, a mold, which may be made of graphite or other suitable material, is provided to give the appropriate shape to the bit body 102, blades 104, and pockets 106. At step 200, this mold may be altered to also form depression or recess 110 in bit 100.

As noted in step 208, metal powders are blended and mixed, placed into the mold, and compacted by pressing to form a green (meaning not fully processed) compact. The applied pressure during compaction eliminates any voids formed during filling, plastically deforms the metal particles and increases inter-particle contact area.

After pressing, the green compact lacks strength and hardness and may be easily crumbled. At step 216, the green compact is heated, typically to 0.7-0.9 times the melting point of the compact, which is termed solid-state or solid-phase sintering. Heating may be accomplished in a furnace with a controlled atmosphere to protect from oxidation. The resultant component is referred to as a matrix.

At step 224, the matrix is infiltrated with a molten metal alloy, which provides improved toughness and strength and a more uniform density. The melting point of the infiltrating metal alloy is lower than the melting point of the matrix, and the filler metal alloy is drawn into the porous matrix by capillary action.

As indicated by step 231, cutting elements 108 may be inserted into pockets 106 prior to the infiltration step 224, and the infiltration process bonds the cutting elements in place. Alternatively, after the infiltration step 224, cutting elements 108 may be inserted into pockets 106 as indicated in step 232 and brazed in place in step 240. The braze joints are then cleaned.

Regardless of the process by which cutting elements 108 are fixed into pockets 106, at step 248, cutting element support shoes 120 are mounted to the blades 104 to provide a mechanical means of holding cutting elements 108 within pockets 106. Finally, in step 256, hard facing may be applied to the bit 100 as desired.

While the above-described embodiments have primarily focused on fixed cutter bits, persons of ordinary skill in the art will understand that a cutting element support shoe may also be used with any drill bit member where cutting elements are attached to a surface. For example, cutting elements may be attached to the bit body, and to the arms and/or rollers or roller cones of rotary drill bits, such as bit 310 illustrated in FIG. 6.

Figure 6:
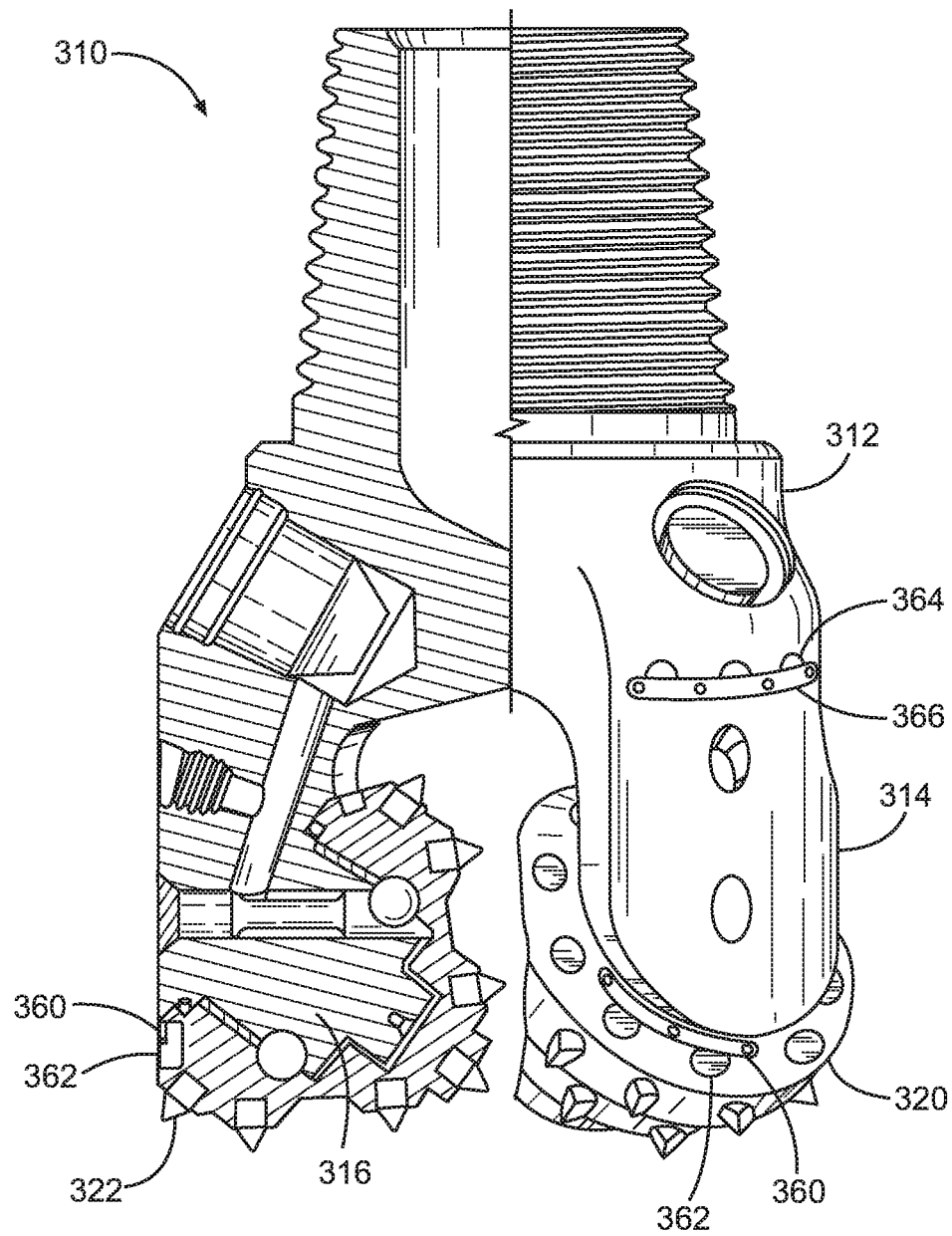
FIG. 6 is an elevation view in partial cross section of a roller cone drill bit according to an embodiment, showing roller cones and arms having cutting elements mechanically fixed to the bit using cutting element support shoes.

FIG. 6 illustrates a roller cone drill bit 310 that roller cones having one or more cutting element support shoes 360. Bit 310 includes a bit body 312, which preferably includes protruding arms 314 that terminate as journals 316. A roller cone 320 carrying a large number discrete cutters 322, is rotatively captured on each journal 316.

In addition to cutter teeth 322, rollers 320 may include gauge cutting elements 362, which may be tungsten carbide, PDC, natural diamond, or TSP, for example. Cutting elements may be mechanically held in place with a curved cutting element support shoe 360 in a substantially similar fashion as described above with respect to fixed cutter drill bit 100. Similarly, arms 314 may have fixed gauge cutting elements 364, which also may be mechanically held in place with curved cutting element support shoe 366. Although not illustrated, one or more appropriately designed cutting element support shoes may be used to mechanically secure cutter teeth 322 in certain embodiments. As the method of forming depressions and recesses and mounting cutting element support shoes has been fully described above with respect to fixed cutter bits, such details are not repeated here.

In summary, a drilling system, drill bit, and method of manufacture have been described. Embodiments of the drilling system may generally have a drill string, a drill bit coupled to the drill string so as to rotate within a wellbore, the drill bit including a plurality of cutting elements disposed within pockets, and a cutting element support shoe mounted to the drill bit so as to partially cover each of the plurality of cutting elements and thereby mechanically fasten the plurality of cutting elements to the drill bit. Embodiments of the drill bit may generally have a drill bit member selected from one of the group consisting of a bit body, a blade, an arm, and a roller, a plurality of pockets formed in the drill bit member, a plurality of cutting elements received within the plurality of pockets, and a cutting element support shoe mounted to the drill bit member so as to partially cover each of the plurality of cutting elements and thereby mechanically fasten the plurality of cutting elements to the drill bit. Embodiments of the method may generally include providing a drill bit member having a plurality of pockets formed therein, the drill bit member being selected from one of the group consisting of a bit body, a blade, an arm, and a roller, disposing a plurality of cutting elements into the plurality of pockets, and mounting a cutting element support shoe to the drill bit member so as to partially cover the plurality of cutting elements and thereby mechanically fasten the plurality of cutting elements to the drill bit member.

Any of the foregoing embodiments may include any one of the following elements or characteristics, alone or in combination with each other: The cutting element support shoe is removably mounted to the drill bit member; a recess formed in the drill bit member into which the cutting element support shoe is received; the drill bit member and the cutting element support shoe are sized so that the cutting element support shoe becomes deformed when mounted to the drill bit member; the cutting element support shoe is elastically deformed; a hard facing applied to the drill bit member and the cutting element support shoe; and the plurality of cutting elements are brazed within the pockets.

The Abstract of the disclosure is solely for providing the United States Patent and Trademark Office and the public at large with a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodi-

What is claimed:

1. A system for drilling a wellbore in an earthen formation, comprising:
   a drill string;
   a drill bit coupled to said drill string so as to rotate within said wellbore, said drill bit including a plurality of cutting elements disposed and fixed in place within pockets; and
   a cutting element support shoe removably mounted to said drill bit so as to partially cover said plurality of cutting elements and thereby mechanically fasten said plurality of cutting elements to said drill bit, wherein said drill bit and said cutting element support shoe are sized so that said cutting element support shoe becomes deformed when mounted to said drill bit to thereby provide an additional retaining force to said plurality of cutting elements.

2. The system of claim 1 wherein:
   said cutting element support shoe is mounted to one of the group consisting of a bit body, a blade, an arm, and a roller.

3. The system of claim 1 further comprising:
   a recess formed in said drill bit into which said cutting element support shoe is received.

4. The system of claim 1 wherein:
   said cutting element support shoe is shaped to be elastically deformed in response to mounting the cutting element support shoe to the drill bit.

5. The system of claim 1 further comprising:
   a hard facing applied to at least a portion of said drill bit and said cutting element support shoe.

6. The system of claim 1 wherein:
   said plurality of cutting elements are brazed in place within said pockets.

7. A drill bit for drilling a wellbore in an earthen formation, comprising:
   a plurality of pockets formed in one of the group consisting of a bit body, a blade, an arm, and a roller;
   a plurality of cutting elements received and fixed within said plurality of pockets; and
   a cutting element support shoe mounted to said drill bit so as to partially cover each of said plurality of cutting elements while leaving cutting edges of the cutting elements exposed, and thereby mechanically fasten said plurality of cutting elements to said drill bit, wherein said drill bit and said cutting element support shoe are sized so that said cutting element support shoe becomes deformed when mounted to said drill bit to thereby provide an additional retaining force to said plurality of cutting elements.

8. The drill bit of claim 7 wherein:
   said cutting element support shoe is removably mounted to said drill bit.

9. The drill bit of claim 7 further comprising:
   a recess formed in said drill bit into which said cutting element support shoe is received.

10. The drill bit of claim 7 wherein:
    said cutting element support shoe is elastically deformed.

11. The drill bit of claim 7 further comprising:
    a hard facing applied to at least a portion of said drill bit and said cutting element support shoe.

12. The drill bit of claim 7 wherein:
    said plurality of cutting elements are brazed within said pockets.

13. A method for manufacturing a drill bit, comprising:
    providing a plurality of pockets within one of the group consisting of a bit body, a blade, an arm, and a roller;
    fixing a plurality of cutting elements into place within said plurality of pockets; and
    mounting a cutting element support shoe to said drill bit so as to partially cover said plurality of cutting elements and thereby mechanically fasten said plurality of cutting elements to said drill bit;
    applying a retaining force to said plurality of cutting elements by deforming said cutting element support shoe while mounting said cutting element support shoe to said drill bit, said drill bit and said cutting element support shoe sized so that said cutting element support shoe becomes deformed when mounting said cutting element support shoe to said drill bit.

14. The method of claim 13 further comprising:
    removably mounting said cutting element support shoe to said drill bit.

15. The method of claim 13 further comprising:
    forming a recess in said drill bit; and
    disposing said cutting element support shoe into said recess.

16. The method of claim 13 further comprising:
    elastically deforming said cutting element support.

17. The method of claim 13 further comprising:
    brazing said plurality of cutting elements within said pockets.

18. The method of claim 13 further comprising:
    applying a hard facing to at least a portion of said drill bit and said cutting element support shoe.

* * * * *